United States Patent [19]
Yoshihara et al.

[11] Patent Number: 5,227,830
[45] Date of Patent: Jul. 13, 1993

[54] AUTOMATIC CAMERA

[75] Inventors: Takafumi Yoshihara, Hachioji; Toshiaki Wada, Tama, both of Japan

[73] Assignee: Olympus Optical Co., Ltd., Tokyo, Japan

[21] Appl. No.: 916,792

[22] Filed: Jul. 17, 1992

Related U.S. Application Data

[63] Continuation of Ser. No. 614,500, Nov. 15, 1990.

[30] Foreign Application Priority Data

Nov. 27, 1989 [JP] Japan .................................. 1-307323
Nov. 27, 1989 [JP] Japan .................................. 1-307324

[51] Int. Cl.$^5$ ............................................. G03B 7/08
[52] U.S. Cl. ................................. 354/402; 354/412; 354/432
[58] Field of Search ............... 354/400, 402, 195.1, 354/412, 432; 250/201.7

[56] References Cited

U.S. PATENT DOCUMENTS 4,965,443 10/1990 Yamasaki et al. ................. 250/201.7
4,978,990 12/1990 Yamasaki et al. ................. 354/432

FOREIGN PATENT DOCUMENTS

57-42026 3/1982 Japan .
61-173226 8/1986 Japan .

Primary Examiner—Russell E. Adams
Attorney, Agent, or Firm—Frishauf, Holtz, Goodman & Woodward

[57] ABSTRACT

In a focus detection device for a camera, a plurality of distance sensors each for detecting a distance to an object in a plurality of areas of a photographing image plane are provided and distance data obtained by the distance sensors for each object in each area is supplied to a main object detection circuit and a normalizing circuit. The normalizing circuit normalizes the distance data into a real number ranging from 0 to 1 and then supplies the same to a neural network. The neural network formed of a single-layered neuron units of which the synapse connection weighting factors are previously obtained by the learning process, calculates a vector difference between the distance data and the synapse connection weighting factors of each neuron unit, detects the minimum vector difference, and outputs position data of a main object corresponding to a neuron unit which gives the minimum vector difference. The position data of the main object is input to a main object detection circuit. One of the outputs from the distance sensors corresponding to the main object is selected by the main object detection circuit and is supplied to a focus detection circuit for effecting the calculation to detect the focus. An output of the focus detection circuit is supplied to a lens driving mechanism so as to adjust the focus.

15 Claims, 10 Drawing Sheets

AUTOMATIC CAMERA

This application is a continuation of application Ser. No. 07/614,500, filed Nov. 15, 1990.

BACKGROUND OF THE INVENTION

Field of the Invention

This invention relates to an automatic camera having various automated operations, and more particularly to the improvement of the focus detection and exposure calculation thereof.

Description of the Related Art

In the conventional camera, and more particularly in the conventional automatic focusing camera, a focus frame for distance measuring is positioned in the central portion of the image plane and the composition of a picture is so decided that the main object to be photographed may be set in the central portion. In a case where it is required to photograph a picture under a condition that the main object is not present in the central portion or where the composition of the picture is freely decided without placing the main object in the central portion, the main object is first positioned in the focus frame, the focus set at this time is locked, and then the composition of the picture is changed for desired photographing.

Further, conventionally, there is also provided an automatic focusing camera which measures distances not only at one point but at various points and sets the focus on a point at a desired one of the measured distances, for example, at the minimum distance among them.

Also, there is known to be proposed an automatic focus controlling method in which pattern analysis for a large number of pictures is effected to define a membership function, wherein an approximation inference is effected based on the relation of distance data at three points by use of a fuzzy theory to define the position of the main object, and wherein focus is set on the position of the main object thus determined.

However, in the conventional automatic camera having only one focus frame positioned in the central portion of the image plane, an out-of-focus picture is photographed when two persons are observed on right and left sides of the frame, for example. Further, the focus-lock operation is troublesome and is not desirable for rapid photographing. In addition, in a case where distances at various points are measured and the focus is set on a point, for example, at the minimum distance among them, a picture which the photographer wants to take cannot be always taken. Further, in the case of using the fuzzy theory, it is difficult to define a suitable membership function and therefore the quality of the picture is determined by the result of the definition, and since it is based on the approximation inference, the time required for processing distance data becomes extremely long if an amount of distance data to be processed becomes large.

In the conventional automatic exposure (AE) camera, as is disclosed in Japanese Patent Disclosure No 57-42026, an exposure controlling method is known in which a plurality of brightness patterns are set based on actual photograph data. Each brightness measured for each of a plurality of areas obtained by dividing the image plane is compared with the plurality of brightness patterns, and an optimum one of exposure determining factors such as central portion weighting, average, high-brightness weighting, and low-brightness weighting is selected to control the exposure. Further, as is disclosed in Japanese Patent Disclosure No. 61-173226, the backlighted condition is detected based on the spot brightness value of the central portion of the image plane and the average brightness value of the entire portion of the image plane, and exposure correction thereby is effected.

However, though the above exposure control operation can be applied to previously programmed scenes, it may not be suitably applied to non-programmed other scenes. In the exposure controlling operation in which much weight is applied to the central portion of the image plane, suitable exposure can be obtained when an object is observed in the central portion of the image plane, but suitable exposure cannot be obtained in other cases. Even in such a case, if AE lock is effected after the object is set on the central portion of the image plane, suitable exposure can always be obtained irrespective of the position of the object. However, the AE lock is troublesome and it is not suitable for rapid photographing.

Thus, the focus detection and exposure calculation in the conventional camera can be successfully made only under previously determined and limited conditions and will not permit pictures which the photographer wants to take to be taken under any condition.

SUMMARY OF THE INVENTION

A main object of this invention is to provide an automatic camera which permits pictures which the photographer wants to take to be automatically taken under any condition.

Another object of this invention is to provide a focus detection device for a camera which is simple in construction and which can determine a main object in a short period of time under any condition and which can rapidly detect the focal distance to the main object.

Still another object of this invention is to provide an exposure calculation device for a camera which is simple in construction and which can determine an optimum exposure in a short period of time under any condition.

An automatic camera according to this invention comprises measuring means for measuring distance and/or brightness of an object for each of a plurality of areas obtained by dividing an image plane to derive a distance pattern and/or brightness pattern of the object; a single-layered neural network arranged to receive an output of the measuring means and having a plurality of neuron units which are previously made to learn that one of the neuron units corresponding to the position of a main object and/or exposure correction value is fired in response to the distance pattern and/or brightness pattern of the object; and photographing means for effecting the focus controlling operation and/or exposure controlling operation in response to outputs of the neural network and measuring means.

According to the automatic camera of this invention, any object can always be photographed according to the intention of the photographer by causing the neural network to output the position of the main object and/or the optimum exposure correction value according to the distance pattern and/or brightness pattern of each area of the object, the neural network self-learning so as to meet the requirements of the user.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE PREFERRED EMBODIMENTS

There will now be described an embodiment of an automatic camera according to this invention with reference to the accompanying drawings. This invention is featured in that the focus detection and/or exposure calculation of a camera are effected by use of a neural network.

The focus detection in this invention is effected by means of a single-layered neural network constituted by a plurality of neuron units and designed to receive a distance data vector representing a distance pattern of an object for respective areas of one image plane through the preset synapse connection weighting factors. The neural network is designed to learn that it outputs position data relating to a main object on which the focus is desirably set in the image plane when the distance data vector which is a collection of distance data for a plurality of points on a given image plane is input, and the focus is adjusted based on the output thereof. In the learning process, it is assumed that the main objects on image planes having similar distance data vectors are set in substantially the same position, and the neural network is made to learn respective distance data vectors by use of a large number of model patterns.

The exposure calculation in this invention is effected by means of a single-layered neural network constituted by a plurality of neuron units and designed to receive a distance data vector representing a distance pattern of an object for respective areas of one image plane through the preset synapse connection weighting factors. The neural network is designed to learn that it outputs exposure correction value data for a given image plane when the brightness data vector which is a collection of brightness data for a plurality of points on the given image plane is input, and the exposure is adjusted based on the output thereof. In the learning process, it is assumed that the exposure correction values for the image planes having similar brightness data vectors may have substantially the same value and the neural network is made to learn respective brightness data vectors by use of a large number of model patterns.

Figure 1:
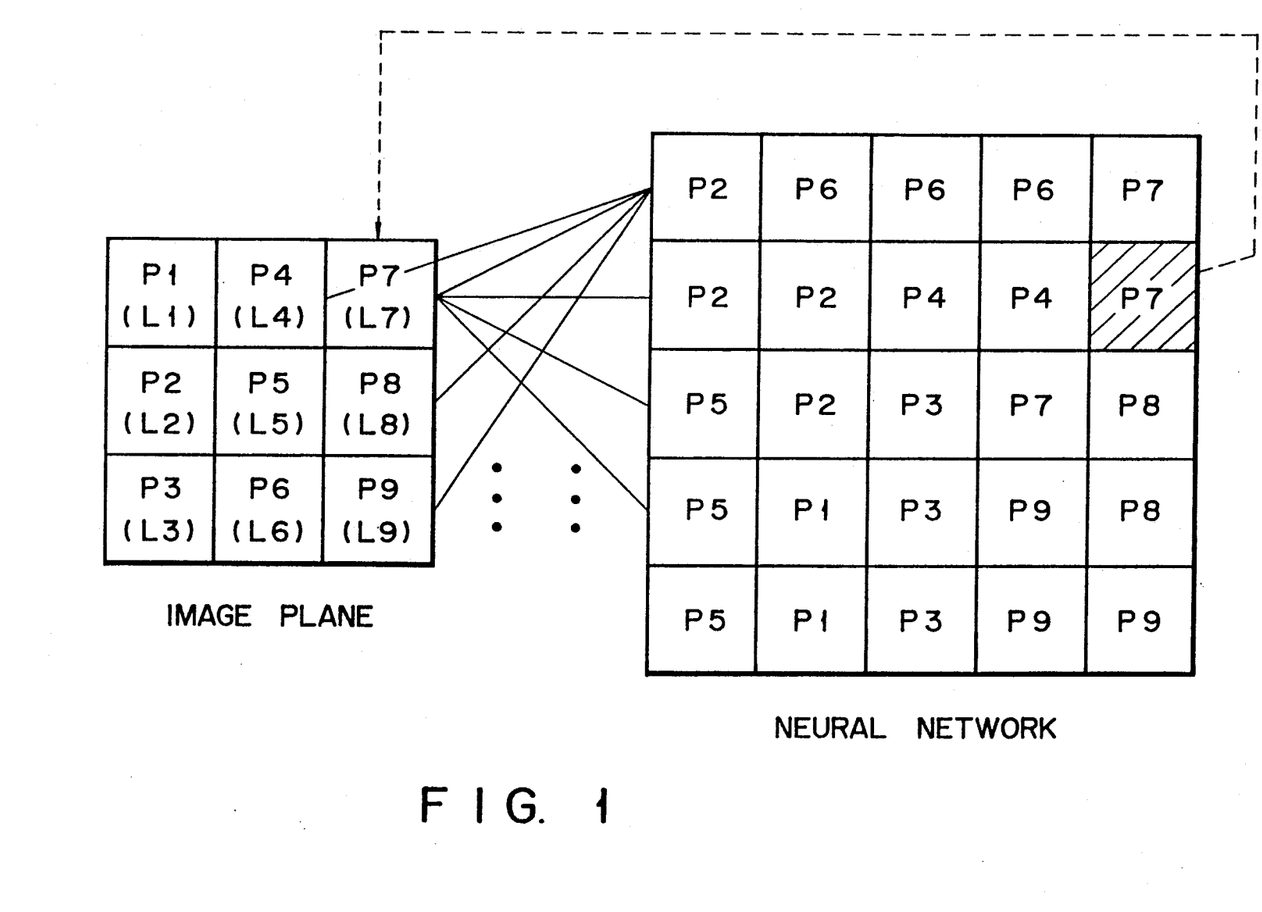
FIG. 1 is a diagram schematically showing the focus detection operation of a camera according to this invention.

First, the focus detection is explained in detail. FIG. 1 schematically shows means for determining the main object to which the photographer wishes to focus from a plurality of objects in one image plane by using the neural network according to this invention. An input image plane shown on the left side of FIG. 1 is a photographing image plane observed through the finder of the camera and is divided into a plurality of areas Pi ($i=1$ to n, n is a positive integer and 9 in FIG. 1) arranged in a two-dimensional matrix form, and distance data Li with respect to the object in each area Pi are measured. In practice, the distance with respect to the center of the area is measured. The neutral network shown on the right side of FIG. 1 receives distance data vector Li for each area Pi of the input image plane and determines an area Px in which the main object is present. The neural network used in this invention is a single-layered neural network constituted by a plurality of (25, in this example) neuron units which receive distance data vectors through the preset synapse connection weighting factors and the whole distance vector data is input to each neuron unit shown in FIG. 1 as a square block.

The learning process of the neural network is comprised of the following two steps. First, distance data vectors in a large number of model patterns are input to the neural network and initial synapse connection weighting factors are derived by an unsupervised learning process. The unsupervised learning process is to correct the synapse connection weighting factors of each neuron unit so that it may selectively respond to a specified input distance data vector without using teacher data, and the distance data vectors can be automatically classified on the network. Then, output neuron units of the neural network set when the distance data vectors of the model pattern are input to the neural network again are set to correspond to areas in which the main object in the model pattern is present. That is, areas indicated in the respective neuron units of FIG. 1 are areas in which the main object is present.

At the photographing time, if the distance data vector Li for each area Pi in the image plane to be photographed as shown in FIG. 1 is input to the neural network which has been subjected to the leaning process, then one of the neuron units is most strongly fired and it becomes possible to determine that the distance measuring area Px (P7 in FIG. 1) corresponding to the most strongly fired neuron unit corresponds to the main object (in FIG. 1, the neuron unit which is most strongly fired is indicated by a hatched portion), and therefore, a picture in which the main object is focused can always be taken by setting the focus on the measuring area P7 corresponding to the fired neuron unit.

Now, the neural network used in this invention is explained with reference to FIGS. 2 to 4. The model of the neural network was proposed by Kohonen of Helsinki engineering college (Finland), and is called a self-organized network. The learning process is known as self-organized feature mapping.

Figure 2:
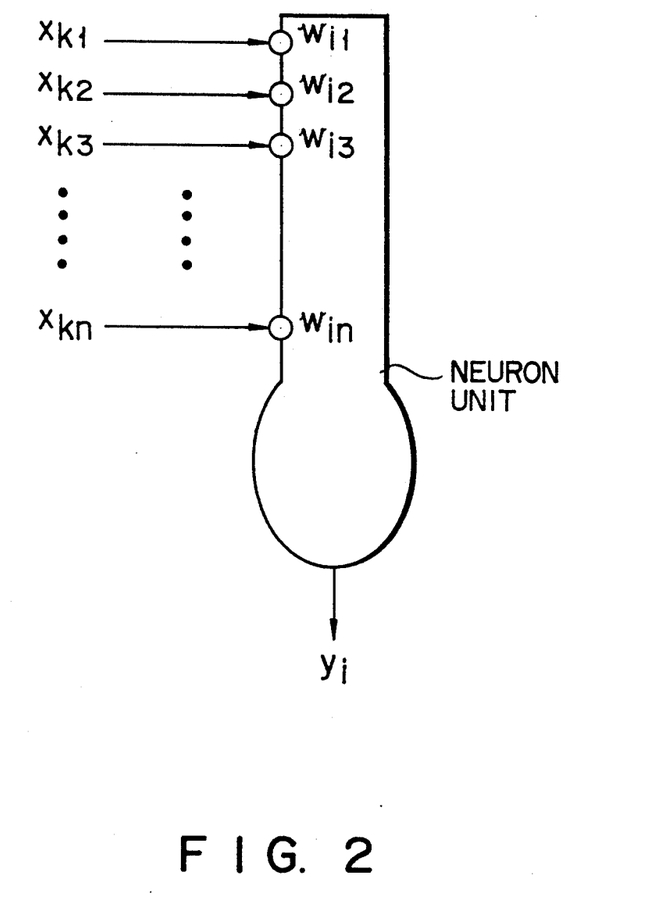
FIG. 2 is a diagram showing a model of a neuron unit constituting a neural network used in this invention.

FIG. 2 shows a model of each neuron unit. The neuron unit is connected to each input value of an input vector through the synapse connection, and compares the input value with each synapse connection weighting factor and supplies an output corresponding to the matching degree between the compared values.

An output yi of an i-th neuron unit is expressed by the following equation.

$$y_i = f\left(\sum_{j=1}^{n} w_{ij} \times x_{kj}\right) \quad (1)$$

where f is an output function (which is normally a sigmoid type monotone increasing function) of the neuron unit, $w_{ij}$ is the synapse connection weighting factor for an j-th input $x_{kj}$ of the i-th neuron unit, $x_{kj}$ is a j-th input value of a k-th input vector, and n is the number of dimensions of the input vector.

Figure 3:
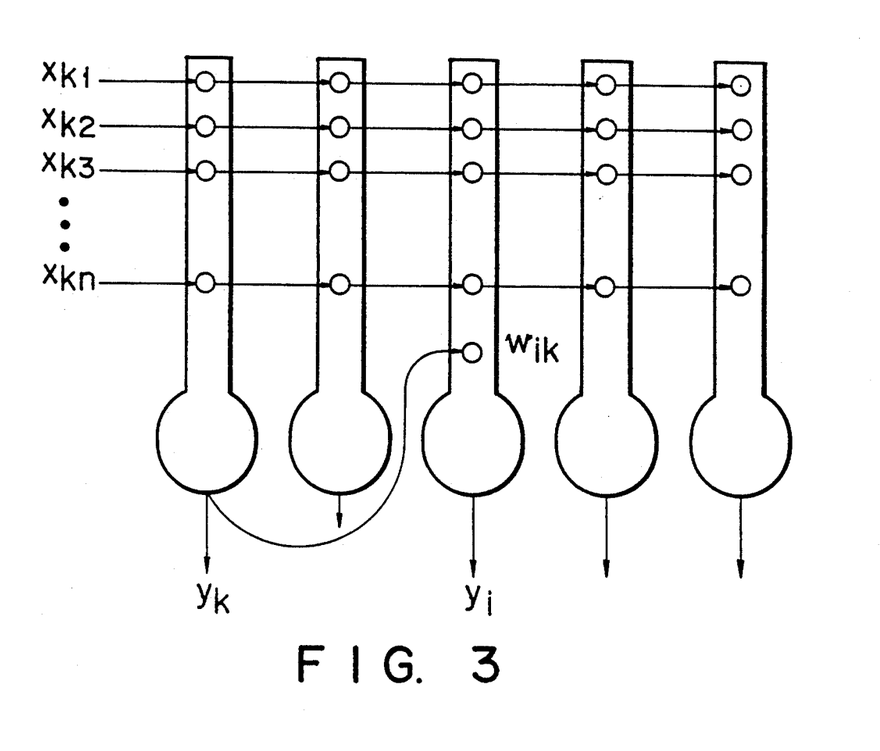
FIG. 3 is a diagram showing a model of the neural network used in this invention.

In general, the neural network is constituted by arranging the neuron units in two-dimensional form, but in this example, the one-dimensional neural network is formed as a model for brief explanation and shown in FIG. 3.

As shown in FIG. 3, the neural network effects the self-organized feature mapping into which the influence of the feedback connection of a signal from the output of a given neuron unit to the input of another neuron unit is introduced. In this case, $w_{ik}$ indicates the feedback connection weighting factor of the feedback connection from the k-th neuron unit to the i-th neuron unit.

Figure 4:
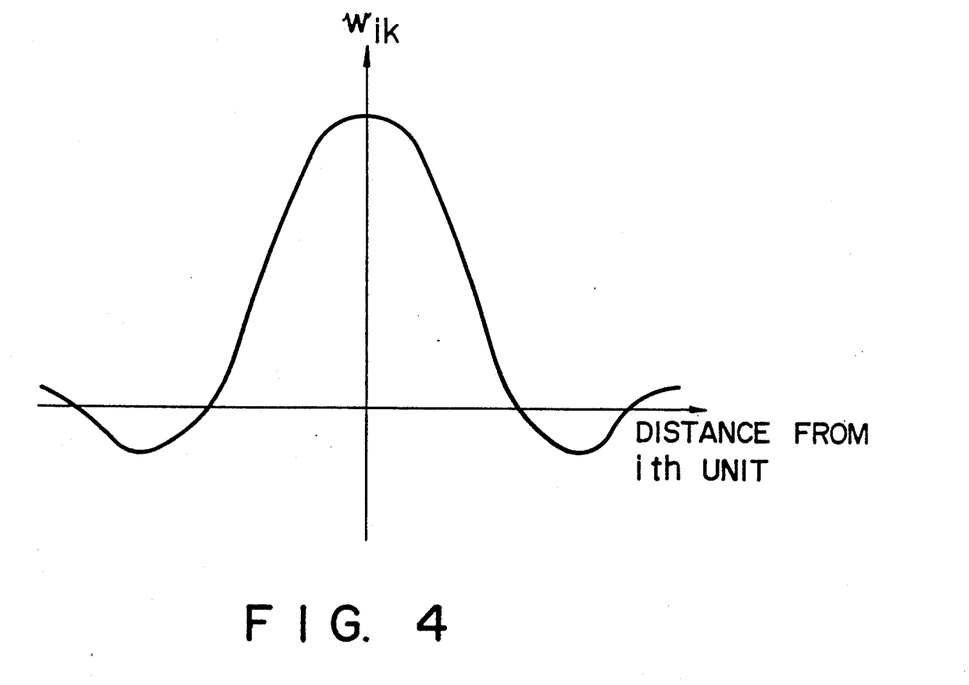
FIG. 4 is a diagram showing variation in the synapse connection weighting factor due to the feedback connection of the neuron unit.

FIG. 4 shows the degree of influence of the feedback connection on the synapse connection weighting factor. That is, the synapse connection weighting factor exhibits Mexican hat type characteristic variation caused by the effect of the feedback connection, and when the output of a given neuron unit rises, the outputs of neuron units which lie near the given neuron unit also rise and the outputs of neuron units which lie outside them is lowered.

When consideration is made such that the learning of the synapse connection weighting factor in consideration of the effect of the feedback connection can be effected only in the vicinity of a neuron unit having a best matching, the learning process (self-organized feature mapping) of the neural network can be effected in the following procedure.

Step #1: the synapse connection weighting factor vector Wi(O) is initialized by use of random numbers and the number t of learning processes is set to 0. In this case, $W_i(t) = (w_{i1}(t), w_{i2}(t), \ldots, w_{in}(t))$.

Next, the process of steps #2 and #3 is repeatedly effected with respect to each input vector Xk.

Step #2: the learning process number t is set to (t+1) and a best-matching neuron unit c which satisfies the following equation is detected.

$$||Xk - Wc(t)|| = \min\{||Xk - Wi(t)||\} \quad (2)$$

where $Xk = (x_{k1}, x_{k2}, \ldots, x_{kn})$ and Wc(t) is a synapse connection weighting factor vector of the best-matching neuron unit c and is $(w_{c1}(t), w_{c2}(t), \ldots, w_{cn}(t))$.

Step #3: in the case of i ε Nc(t), Wi(t+1) is set to $Wi(t) + \alpha(t) \times (Xk - Wi(t))$ and in a case other than the case of i ε Nc(t), Wi(t+1) is set to Wi(t).

In this case, $\alpha(t)$ is a learning coefficient, Nc(t) is a collection of neuron units lying near the best-matching neuron unit c. Generally, $\alpha(t)$ and Nc(t) are both monotone decreasing functions.

By effecting the above self-organized feature mapping, the synapse connection weighting factors of the neighboring neuron units become similar. Further, since the synapse connection weighting factor reflecting the statistical property such as correlation and similarity between the model patterns can be obtained, vector quantization of each model pattern can be effected, thus permitting the model pattern to be classified. The process of determining the position of the main object on a given photographing image plane may be considered as the determination process of the best-matching neuron unit c. As can be inferred from the step #2, the amount of calculation for the process is small and therefore a rapid determination process can be effected.

Figure 5:
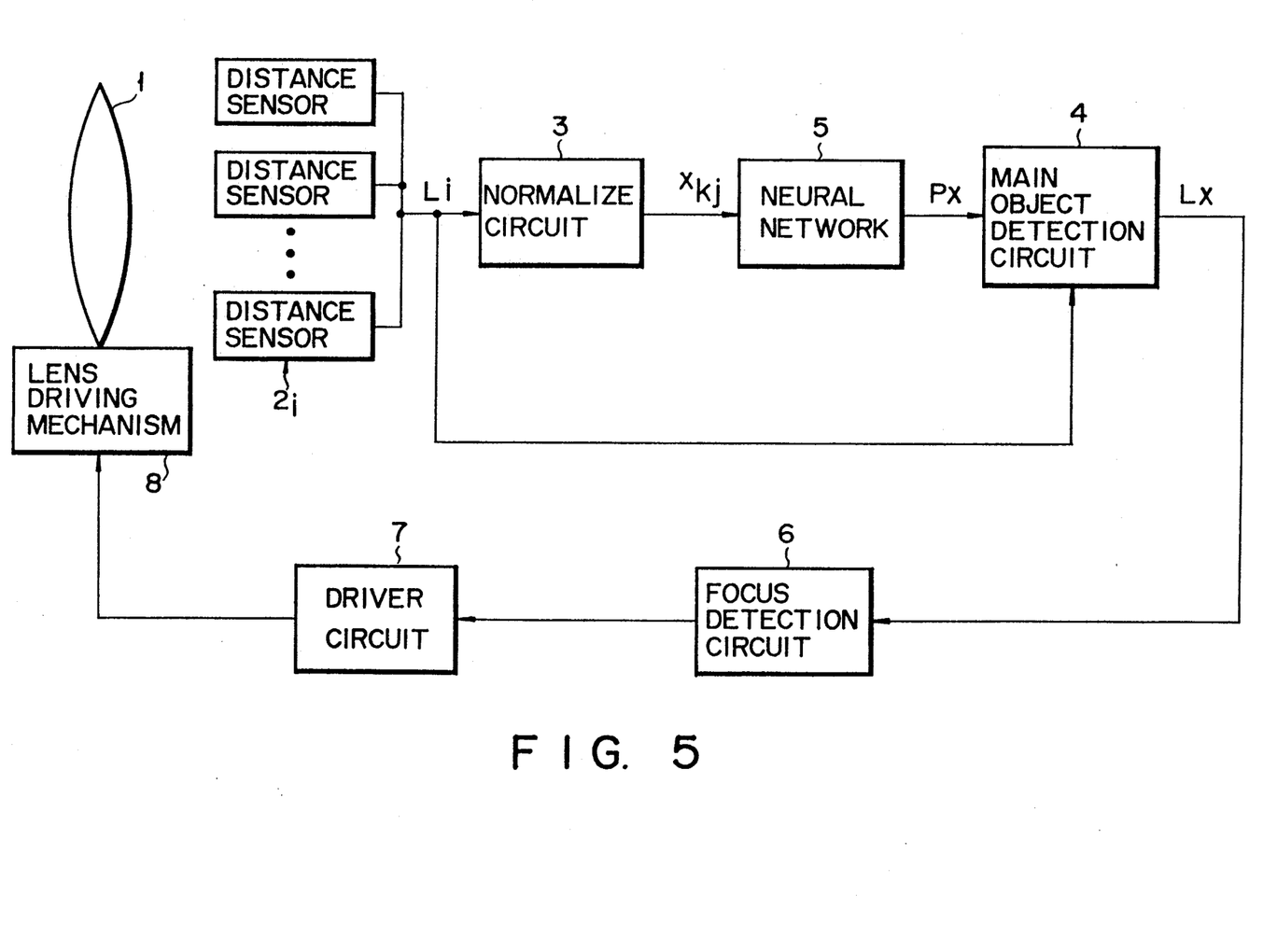
FIG. 5 is a block diagram of an automatic focusing camera according to a first embodiment of this invention.

Now, an embodiment of a focus detection device for a camera according to this invention is explained with reference to FIGS. 5 to 7. FIG. 5 is a block diagram of an automatic focusing camera. A plurality of distance sensors $2_i$ (i=1 to n, n is a positive integer as defined above) for detecting the distance to each of objects located in a plurality of areas on a photographing image plane are provided, and distance data Li derived for each object (area) by means of the distance sensors $2_i$ is supplied to a main object detection circuit 4 and to a normalizing circuit 3. The normalizing circuit 3 normalizes the distance data Li to a real number ranging from 0 to 1 and derives above-described input data vector data $x_{kj}$ so that it can be input to a neural network 5. The output of the normalizing circuit 5 is input to the single-layered neural network 5 constituted by a plurality of neuron units and having the synapse connection weighting factors already obtained by the learning. In this case, data including distance data, for example, deviation amount in the trigonometrical survey and the lateral drift amount in the phase difference method can be used as the distance data in addition to the distance to the object.

The neural network 5 receives a distance data vector data $x_{kj}$, calculates a vector difference $$Ni = \sum_{j=1}^{n} (x_{kj} - w_{ij}(t))^2$$

between the input distance data vector Xk and the synapse connection weighting vector Wi(t) of each neuron unit, searches for the minimum value Dc=minNi of the vector difference, and outputs position data Px of the main object corresponding to the best-matching neuron unit which gives the minimum value. In general, the neural network 5 is constituted by neuron units of a number which is 5 to 20 times the number of the distance measuring areas. The position data Px of the main object is input to the main object detection circuit 4 and distance data Lx from the distance sensor $2_x$ corresponding to the main object is supplied to a focus detection circuit 6 which effects the calculation for focus detection. An output of the focus detection circuit 6 is supplied to a driver circuit 7 which in turn drives a lens driving mechanism 8 to move a lens 1 in the optical axis direction for focus adjustment.

Figure 6:
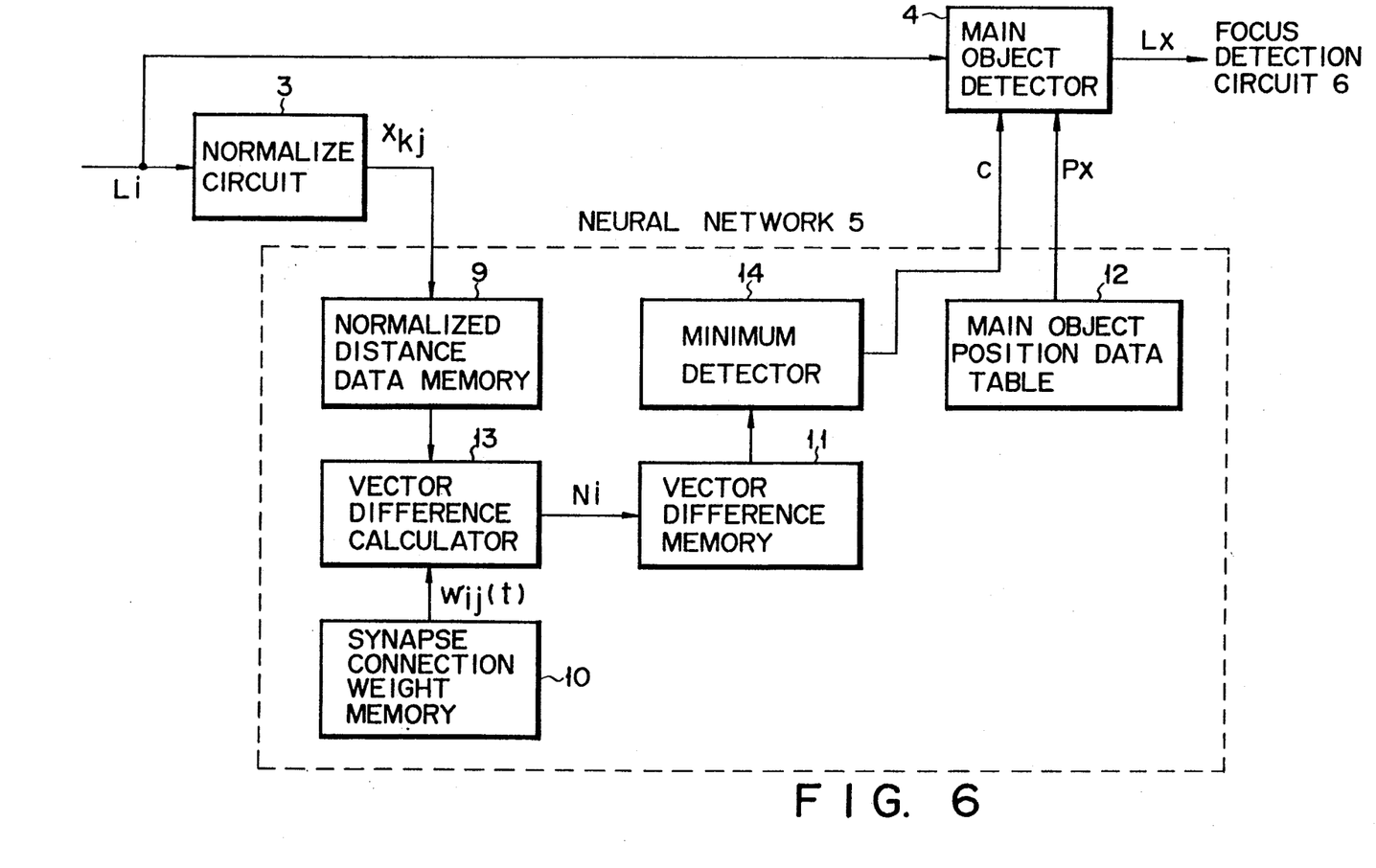
FIG. 6 is a diagram showing the circuit construction of a neural network of the first embodiment.

FIG. 6 shows the details of the neural network 5. The neural network 5 includes memories 9, 10, 11, and 12 for storing various data and various types of arithmetic operation circuits 13 and 14. The memory 9 stores normalized distance data $x_{kj}$ output from the normalizing circuit 3, the memory 10 stores the synapse connection weighting factor $w_{ij}(t)$ obtained by the learning process, the memory 11 stores the vector difference Ni between the normalized distance data $x_{kj}$ and the synapse connection weighting factor $w_{ij}(t)$, and the memory 12 stores main object position data table indicating the relation between each of the neuron units of the neural network 5 which has been subjected to the learning process and the position P of the main object in the photographing image plane. The arithmetic operation circuit 13 calculates the vector difference Ni based on the normalized distance data $x_{kj}$ and the synapse connection weighting factor $w_{ij}(t)$, and the arithmetic operation circuit or detection circuit 14 detects the minimum value of the vector difference Ni.

The normalized distance data $x_{kj}$ from the normalizing circuit 3 is stored into the memory 9 of the neural network 5. The synapse connection weighting factor $w_{ij}(t)$ obtained by the previous learning process is stored in the memory 10. Data in the memories 9 and 10 are supplied to the vector difference calculator 13 which in turn calculates the vector difference $$Ni = \sum_{j=1}^{n} (x_{kj} - w_{ij}(t))^2$$

for each neuron unit and stores the result of calculation into the memory 11. Since the calculation for the vector difference is independently effected for each neuron unit, parallel calculations can be effected. Therefore, the vector difference calculator 13 may be constituted by a plurality of processors which respectively effect the processes of corresponding neuron units, thus making it possible to attain a high-speed process. Further, in the neural network dedicated arithmetic operation element or neuro-chip, the operation process is effected by each neuron unit.

The minimum detector 14 detects a best-matching neuron unit c having the minimum vector difference based on the derived vector differences Ni. The main object detection circuit 4 reads out main object position data Px corresponding to the best-matching neuron unit based on the relation stored in the table 12 and supplies only distance data Lx of the main object among data Li from all the distance sensors $2_i$ to the focus detection circuit 6.

Thus, the automatic focus controlling operation with respect to only the main object among a large number of objects in the input image plane can be effected.

The construction of the neural network described above may be sufficient in the case of applying only the learning result. However, in order to effect the initial learning process and additional learning process for permitting the neural network to be adapted to each camera user, the following learning circuit construction becomes necessary.

Figure 7:
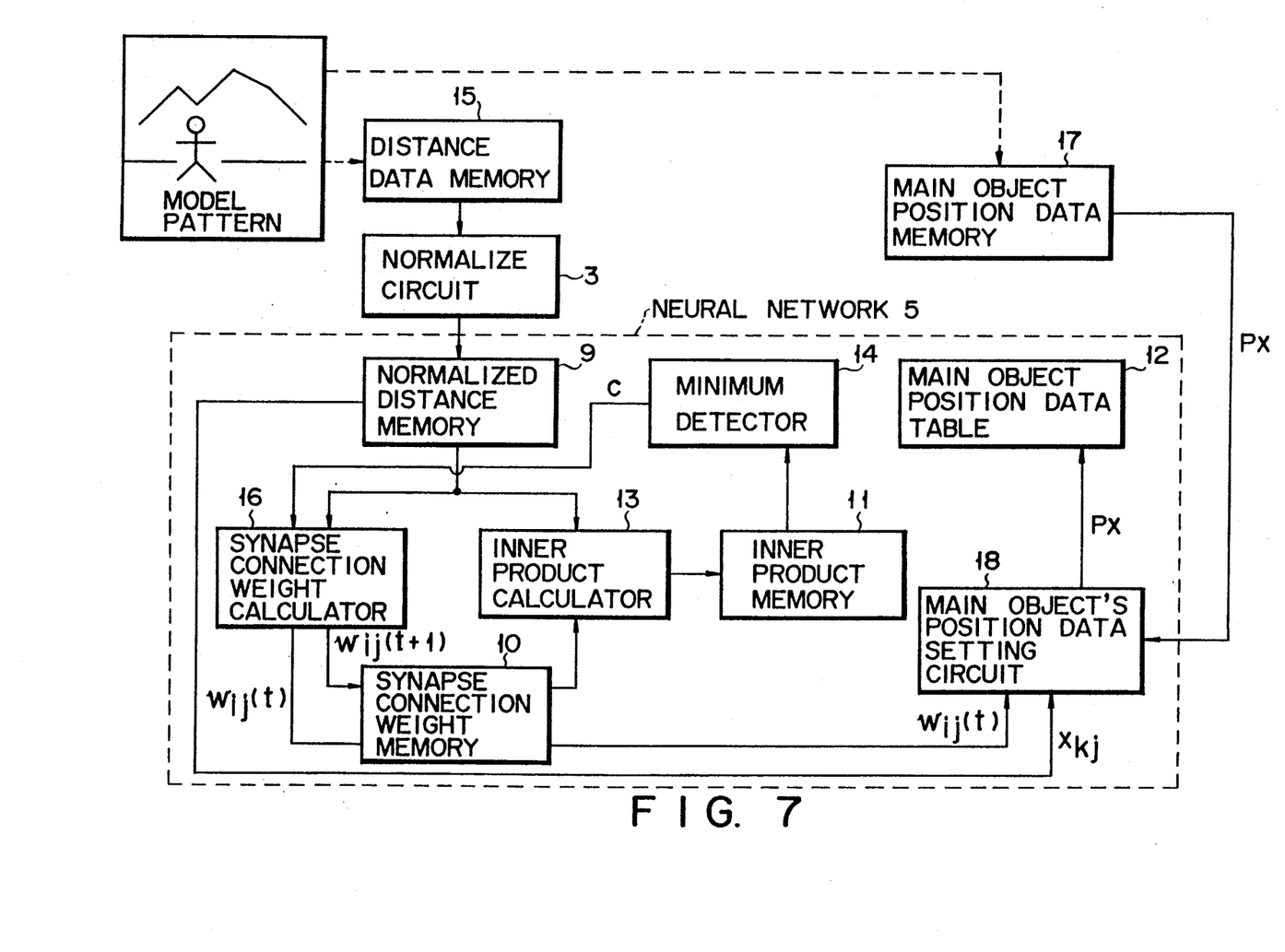
FIG. 7 is a diagram showing the circuit construction for subjecting the neural network shown in FIG. 6 to the learning process.

FIG. 7 shows the circuit construction of the neural network for the learning. This construction can be obtained only by adding a synapse connection weight calculator 16 and a main object position data setting circuit 18 to the circuit shown in FIG. 6.

In operation, the synapse connection weighting factor $w_{ij}$ of each neuron unit of the neural network is initialized by use of a small random number. A large number of model patterns for the learning are prepared, a distance data vector for respective areas of the model pattern is stored into a distance data memory 15 and data Px relating to the area in which the main object in the model pattern lies is stored in a main object position data memory 17. After the best-matching neuron unit c is determined by detecting the minimum vector difference by use of distance data in the memory 15 in the same manner as in the case of FIG. 6, the synapse connection weight calculator 16 corrects and learns the synapse connection weighting factor vectors Wi of a group of neuron units lying around the best-matching neuron unit c. This example shows the case of i ∈ Nc(t).

$$Wi(t+1) = Wi(t) + a(t) \times (Xk - Wi(t)) \qquad (3)$$

where a(t) is a learning coefficient and is a real number ranging from 0 to 1, Nc(t) indicates a collection of neuron units lying around the best-matching neuron unit c and the initial value thereof is not so small as compared with the scale of the neural network. a(t) and Nc(t) are both monotone decreasing functions. t is the number of learning processes and the learning processes are repeatedly effected until the maximum number $t_{max}$ of learning processes is reached.

When the learning process for all the model patterns is completed, the main object position data setting circuit 18 checks the relation between the main object position of each model photographing image plane stored in the memory 17 and the neuron units in the neural network according to the following relation, and sets the checking result into the table 12 as main object position data.

In the case of the output of the i-th neuron unit $$yi\left(=f\left(\sum_{j=1}^{n} w_{ij} \times x_{kj}\right)\right) \geqq \theta k$$

(threshold value in a k-th model pattern), the main object position of the k-th model pattern is set to correspond to the i-th neuron unit.

Thus, the initial learning is completed.

In the neural network which has been subjected to the initial learning process, where an additional learning is effected so as to permit the neural network to be adapted to each camera user, a best-matching neuron unit is determined by detecting the minimum vector difference when a given input pattern is supplied, and then the synapse connection weighting factor vectors Wi of a group of neuron units Nc' which lie near the best-matching neuron unit and whose corresponding main object positions are common are corrected and learned by the synapse connection weight calculator 16, as follows.

$$Wi = Wi + ao \times (Xk - Wi) \qquad (4)$$

This example shows the case of i ∈ Nc' and αo is a learning coefficient.

As described above, according to the first embodiment, a focus detection device for a camera is provided in which the focus of the main object in a variety of image planes can be rapidly detected simply by causing the neural network to learn distance data vectors in a large number of model patterns. Therefore, a process such as a main object specifying process which is difficult to be set in an established form and programmed in the prior art can be performed in a programmed manner. The operation speed can be further enhanced by using the parallel processing of the neuron units. The main object can be more precisely determined by causing the neural network to learn the liking composition of a picture desired by the camera user and the feature of the composition of the picture and thus causing the neural network to be adapted to the camera user.

The first embodiment can be variously modified. The learning method in the first embodiment is the unsupervised learning, but it is possible to use the supervised learning in which an output of the neural network and teacher's data (main object of an input pattern) are compared with each other when the input pattern is supplied, the synapse connection weighting factor is set closer to the input pattern if the neural network is correctly fired and the synapse connection weighting factor is set apart from the input pattern if the neural network is incorrectly fired. In this case, it is possible to learn input data including the teacher's data. In order to permit the initial learning state without the additional learning to be returned at any time, it is necessary to store the synapse connection weighting factor in the initial learning state into the memory.

The automatic focusing camera is explained in the above embodiment, but this invention can be applied to a manual focusing camera in which focusing data relating to the determined main object is auxiliary displayed in a finder or the like.

Next, a case wherein a neural network is used for exposure value calculation of a camera is explained as a second embodiment. The exposure calculation is also effected by a single-layered neural network constituted by a plurality of neuron units to which brightness data vector is input through preset synapse connection weighting factors. The neural network is designed to learn that it outputs exposure correction data for a given image plane when the brightness data vector which is a collection of brightness data for a plurality of points on the given image plane is input, and the exposure is determined based on the output thereof. In this case, the range of the exposure correction values is approx. ±5(EV). In the learning process, it is assumed that the exposure correction values for image planes having similar brightness data vectors are set to substantially the same values, and the neural network is made to learn respective brightness data vectors by use of a large number of model patterns.

Figure 8:
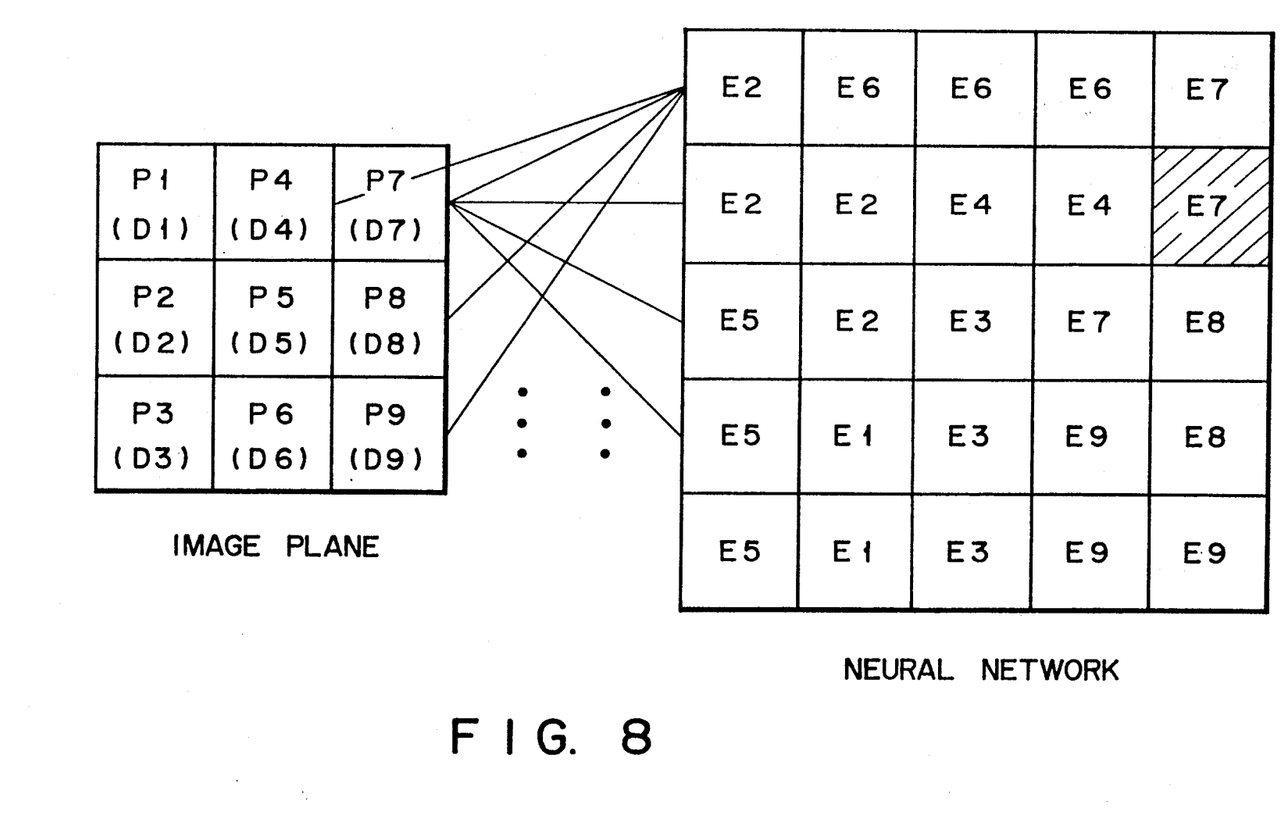
FIG. 8 is a diagram schematically showing the exposure calculating device of a camera according to this invention.

FIG. 8 schematically shows means for determining the exposure correction value using the neural network according to this invention. The input image plane shown on the left side of FIG. 8 is a photographing image plane observed in the finder and is divided into areas Pi (i=1 to n, n is a positive integer and is 9 in FIG. 8) arranged in a two-dimensional matrix form, and brightness data Di for each area Pi is measured. The neural network shown on the right side of FIG. 8 receives brightness data Di for respective areas Pi of the input image plane and determines the exposure correction value Ex for the image plane. The neural network used in this invention is a single-layered network constituted by a plurality of neuron units (25 in this example) to which brightness data are input through the synapse connection weighting factors, and all the brightness data are input to each neuron unit shown as a square block.

The learning process of the neural network includes the following two steps. First, brightness data vectors in a large number of model patterns are input to the neural network and initial synapse connection weighting factors are derived by the unsupervised learning process. The unsupervised learning process is to correct the synapse connection weighting factors of each neuron unit so that it may selectively respond to a given specified input vector without using teacher data, and the brightness data vectors can be automatically classified on the network. Then, output neuron units of the neural network set when the brightness data vectors of the model pattern are input to the neural network again are set to correspond to exposure correction values in the model pattern. That is, values indicated in the respective neuron units of FIG. 8 are the exposure correction values.

At the photographing time, if the brightness data Di for each area Pi in the image plane to be photographed as shown in FIG. 8 are input to the neural network which has been subjected to the learning process, then one of the neuron units is most strongly fired (in FIG. 8, the neuron unit which is most strongly fired is indicated by a hatched portion). It becomes possible to determine that the exposure correction value Ex (E7 in FIG. 8) corresponding to the most strongly fired neuron unit is the optimum exposure correction value, and therefore, a picture with optimum exposure can always be taken by correcting the exposure accordingly.

The model of the neural network is the same as that of the first embodiment explained with reference to FIGS. 2 to 4 and therefore the explanation therefor is omitted.

Figure 9:
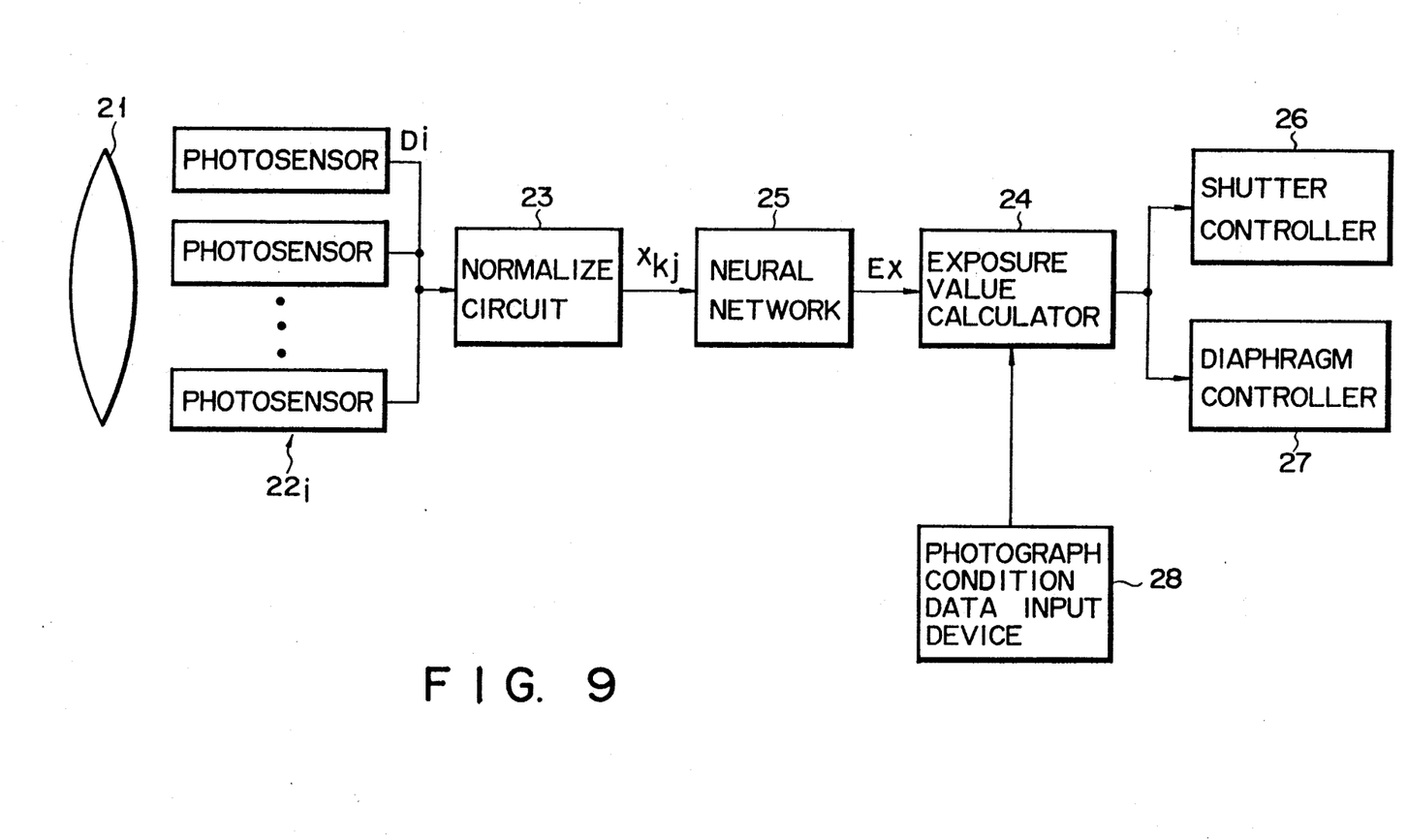
FIG. 9 is a block diagram of an automatic exposure controlling camera according to a second embodiment of this invention.
Figure 10:
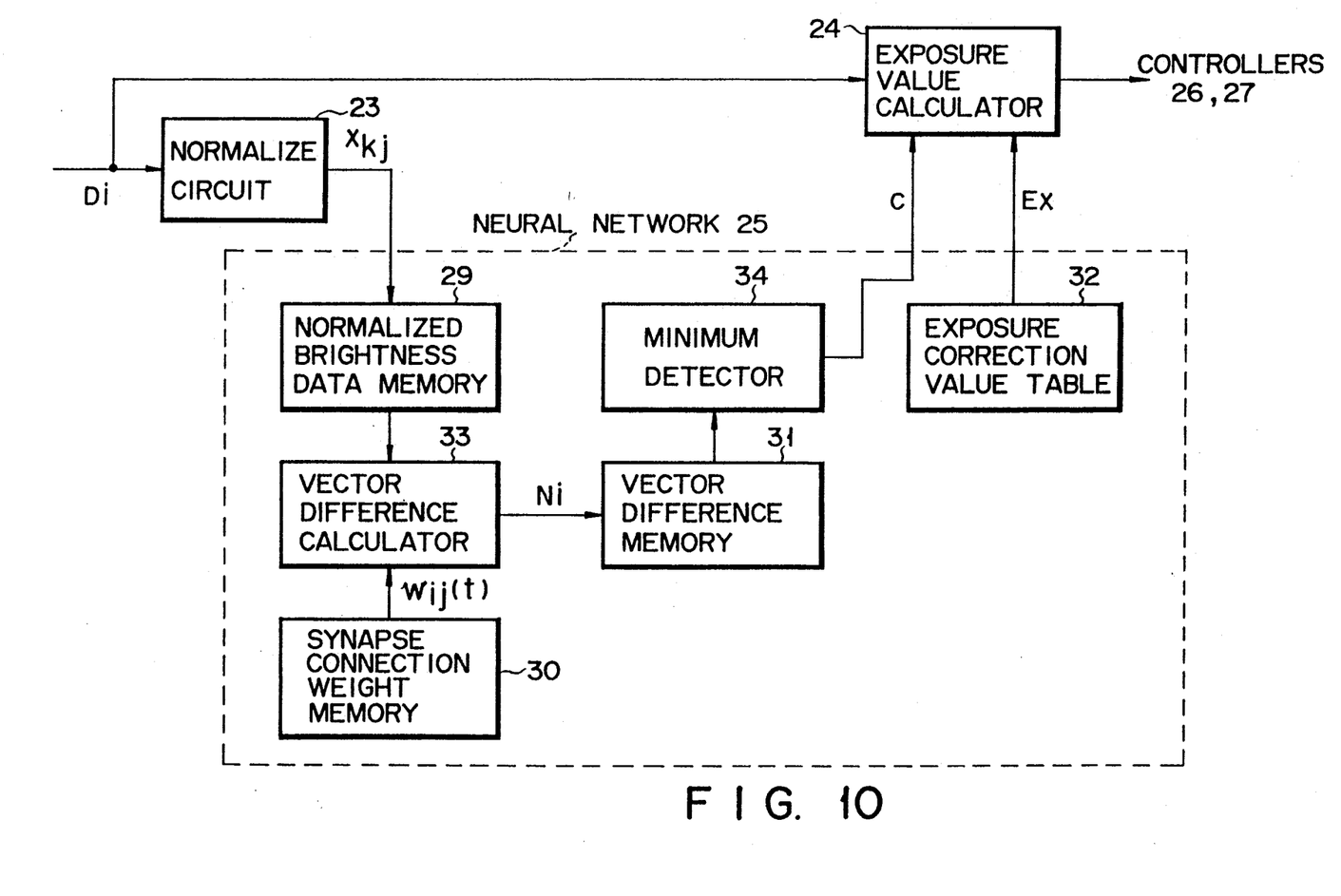
FIG. 10 is a diagram showing the circuit construction of a neural network of the second embodiment.
Figure 11:
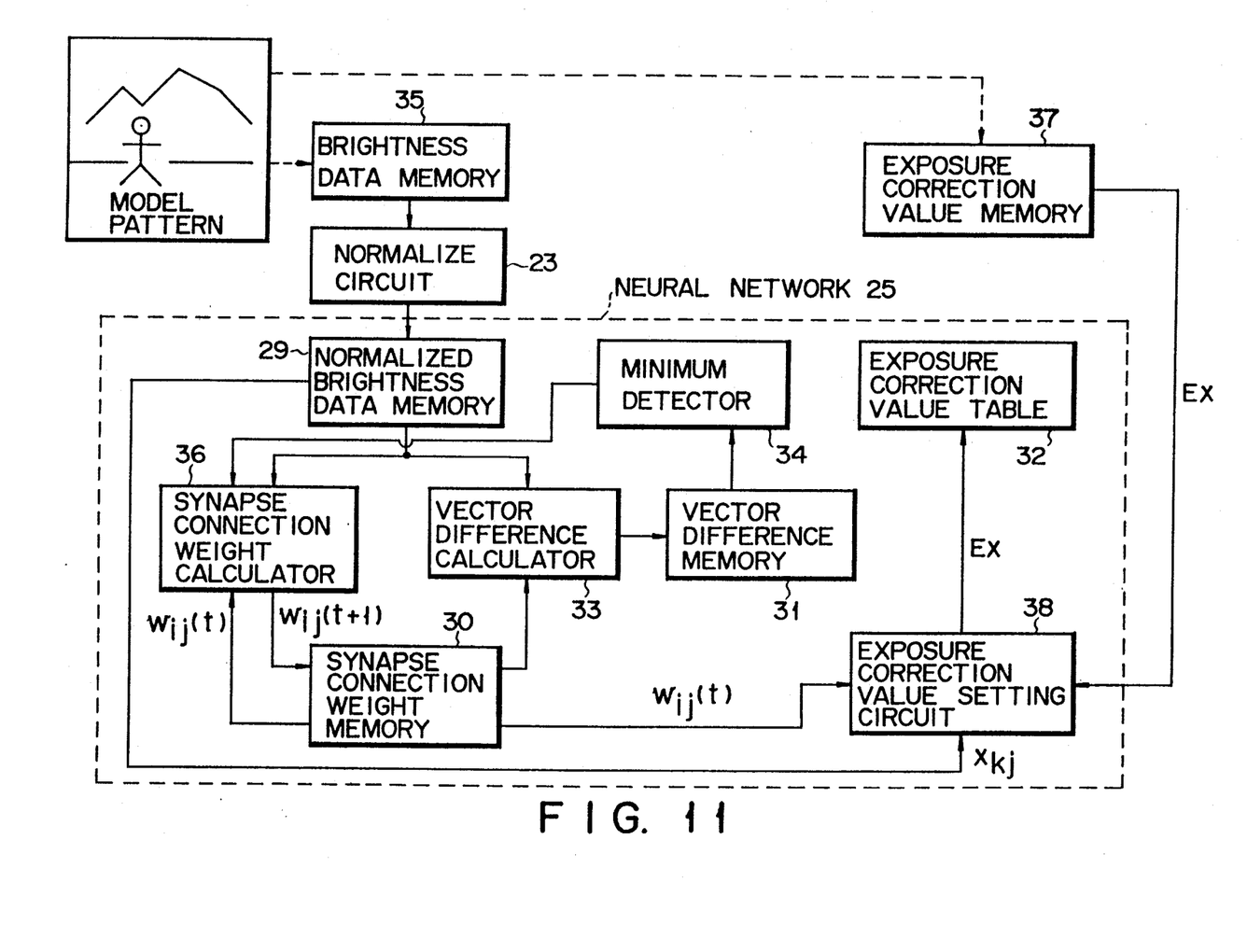
FIG. 11 is a diagram showing the circuit construction for subjecting the neural network shown in FIG. 10 to the learning process.

Now, an automatic exposure controlling camera is explained as the second embodiment of this invention with reference to FIGS. 9 to 11. FIG. 9 is a block diagram of the automatic exposure controlling camera of the second embodiment. A plurality of photosensors $22_i$ (i=1 to n, n is a positive integer as defined above) for detecting the brightness for each of a plurality of areas of an image plane which is made incident via a lens 21 are provided and brightness data Di of each area are supplied to a normalizing circuit 23. The normalizing circuit 23 normalizes the brightness data Di to a real number ranging from 0 to 1 and derives the above-described input vector data $x_{kj}$ so that it can be input to a single-layered neural network 25. An output of the normalizing circuit 23 is input to the neural network 25 which has synapse connection weighting factors obtained by the learning and is constituted by a plurality of neuron units in the same manner as in the case of the first embodiment.

The neural network 25 receives brightness vector data $x_{kj}$, calculates a vector difference $$Ni = \sum_{j=1}^{n} (x_{kj} - w_{ij}(t))^2$$

between the input brightness vector data and the synapse connection weighting factor vector data $w_{ij}(t)$ of each neuron unit, searches for the minimum value $Dc = \min\{Ni\}$ of the vector difference, and outputs an exposure correction value Ex corresponding to a best-matching neuron unit which gives the minimum vector difference. In general, the neural network 25 is constituted by neuron units of a number which is 5 to 20 times the number of the distance measuring areas. The exposure correction data is input to the exposure value calculator 24. The open F-value, diaphragm opening of the lens, film sensitivity, and mode data (shutter priority exposure control mode, diaphragm priority exposure control mode, and the like) from a photograph condition data input device 28 are supplied to the exposure value calculator 24. The exposure value calculator 24 effects the apex calculation (brightness value—open F-value+film sensitivity=shutter speed+diaphragm opening) corresponding to the mode data and the exposure correction calculation based on the exposure value (shutter speed, diaphragm opening) obtained as the result of the apex calculation and an exposure correction value read out from an exposure correction value memory 32 (FIG. 10), and supplies the result of the calculation to shutter controller 26 and diaphragm controller 27.

FIG. 10 shows the concrete circuit construction of the neural network 25. The neural network 25 includes various types of data storing memories 29, 30, 31, and 32 and various types of arithmetic operation circuits 33 and 34. The memory 29 stores normalized brightness data $x_{kj}$ output from the normalizing circuit 23, the memory 30 stores the synapse connection weighting factor $w_{ij}(t)$ obtained by the previous learning process, the memory 31 stores the vector difference Ni between the normalized brightness vector data $x_{kj}$ and the synapse connection weighting factor vector data $w_{ij}(t)$, and the memory 32 stores exposure correction value table indicating the relation between each of the neuron units of the neural network which has been subjected to the learning process and a corresponding exposure correction value Ex of the input pattern. The calculation circuit 33 calculates the vector difference Ni based on the normalized brightness data vector $x_{kj}$ and the synapse connection weighting factor vector $w_{ij}(t)$, and the operation circuit or detection circuit 34 detects the minimum value of the vector difference Ni.

The normalized brightness data $x_{kj}$ from the normalizing circuit 23 is stored into the memory 29 of the neural network 25. The synapse connection weighting factor $w_{ij}(t)$ obtained by the previous learning process is stored in the memory 30. Data in the memories 29 and 30 are supplied to the vector difference calculator 13 which in turn calculates the vector difference $$Ni = \sum_{j=1}^{n} (x_{kj} - w_{ij}(t))^2$$

for each neuron unit and stores the result of calculation into the memory 31. Since the calculation for the vector difference is independently effected for each neuron unit, parallel calculations can be effected. Therefore, the vector difference calculator 33 may be constituted by a plurality of processors which respectively effect the processes of corresponding neuron units, thus making it possible to attain a high-speed process. Further, in the neural network dedicated arithmetic operation element or neuro-chip, the operation process is effected by each neuron unit.

The minimum detector 34 detects a best-matching neuron unit c having the minimum vector difference based on the derived vector differences Ni. The exposure value calculator 24 reads out exposure correction value data Ex corresponding to the best-matching neuron unit c based on the relation previously stored in the table memory 32 and effects the apex calculation and exposure correction calculation based on the exposure correction value data Ex corresponding to the best-matching neuron unit and the open F-value, diaphragm opening, shutter speed, film sensitivity, and mode data supplied from the photograp condition data input device 28, and supplies the calculation result to the shutter controller 26 and diaphragm controller 27.

Thus, the automatic exposure control suitable for a scene of the object in the input image plane can be effected.

An exposure correction value obtained by deriving a weighted average of a plurality of exposure correction values corresponding to a plurality of neuron units selected in an order starting from the maximum one of the values obtained by the equation (1):

$$y_i = f\left(\sum_{j=1}^{n} w_{ij} \times x_{kj}\right)$$

which defines the output of the neuron unit can be used as the exposure correction value data. Further, the construction of the neural network described above may be sufficient in the case of applying only the learning result. However, in order to effect the initial learning process and additional learning process for permitting the neural network to be adapted to each camera user, the following learning circuit construction becomes necessary.

FIG. 11 shows the circuit construction of the neural network for the learning. This construction can be obtained only by adding a synapse connection weight calculator 36 and an exposure correction value setting circuit 38 to the circuit shown in FIG. 10.

In operation, the synapse connection weighting factors $w_{ij}$ of each neuron unit of the neural network are initialized by use of a small random number. A large number of model patterns for the learning are prepared, brightness data for each area of the model pattern is stored into a brightness data memory 35 and data Ex relating to the exposure correction value of the model pattern is stored in an exposure correction value memory 37. After the best-matching neuron unit c is determined by detecting the minimum vector difference by use of the brightness data in the memory 35 in the same manner as in the case of FIG. 10, the synapse connection weight calculator 36 corrects and learns the synapse connection weighting factor vectors Wi of a group of neuron units lying around the best-matching neuron unit c. This example shows the case of $i \in Nc(t)$.

$$Wi(t+1) = Wi(t) + \alpha(t) \times (Xk - Wi(t)) \quad (5)$$

where $\alpha(t)$ is a learning coefficient and is a real number ranging from 0 to 1, and Nc(t) indicates a collection of neuron units lying around the best-matching neuron unit c and the initial value thereof is not so small as compared with the scale of the neural network. $\alpha(t)$ and Nc(t) are both monotone decreasing functions. t is the number of learning processes and the learning processes are repeatedly effected until the maximum learning number $t_{max}$ is reached.

When the learning process for all of the model patterns is completed, the exposure correction value setting circuit 38 checks the relation between the exposure correction value of each model pattern stored in the memory 27 and the neuron units in the neural network according to the following expression, and sets the checking result into the exposure correction value table 32 as exposure correction value data.

In the case of the output of the i-th neuron unit $$yi\left(=f\left(\sum_{j=1}^{n} w_{ij} \times x_{kj}\right)\right) \geq \theta k$$

(threshold value in a k-th model pattern), the exposure correction value of the k-th model pattern is set to correspond to the i-th neuron unit.

In the neural network which has been subjected to the learning process, in a case where an additional learning is effected so as to permit the neural network to be adapted to each camera user, a best-matching neuron unit is determined by detecting the minimum vector difference when a given input pattern is supplied, and then the synaps connection weighting factor vectors Wi of a group of neuron units Nc' which lie near the best-matching neuron unit and whose corresponding exposure correction values are common are corrected and learned by the synapse connection weight calculator 36, as follows.

$$Wi = Wi + \alpha o \times (Xk - Wi) \qquad (6)$$

This example shows the case of $i \in Nc'$ and $\epsilon o$ is a learning coefficient.

As described above, according to the second embodiment, an exposure value calculating device for a camera can be provided in which the exposure correction values for a variety of image planes can be automatically and rapidly derived simply by causing the neural network to learn brightness data vectors in a large number of model patterns. Therefore, a process which is difficult to be set in an established form and programmed in the prior art, for example, in a process of determining the exposure correction values for the scene of an object can be performed in a programmed manner. The operation speed can be further enhanced by using the parallel processing of the neuron units. The exposure which the photographer wants to set can be automatically determined by causing the neural network to learn the liking composition of a picture desired by the camera user and the feature of the composition of the picture and thus causing the neural network to be adapted to the camera user.

The second embodiment can also be variously modified as in the case of the first embodiment. That is, the learning method in the second embodiment is the unsupervised learning, but it is possible to use the supervised learning in which an output of the neural network and teacher's data (exposure correction value of an input pattern) are compared with each other when the input pattern is supplied, the synapse connection weighting factor is set closer to the input pattern if the neural network is correctly fired and the synapse connection weighting factor is set apart from the input pattern if the neural network is incorrectly fired. In this case, it is possible to learn input data including the teacher's data.

In order to permit the initial learning state without the additional learning to be returned at any time, it is necessary to store the synapse connection weighting factor in the initial learning state into the memory.

The automatic exposure controlling camera is explained in the above embodiment, but this invention can be applied to a manual exposure controlling camera in which exposure data determined by using the neural network is auxiliary displayed in a finder or the like.

As described above, according to this invention, it is possible to provide an automatic camera in which the optimum main object and/or an exposure correction value corresponding to the pattern on the input image plane can be derived from the data pattern of the input image plane by using the neural network, thereby permitting a picture which the photographer wants to take to be automatically taken under the same condition.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An automatic camera comprising:
   first measuring means for measuring distance of an object positioned in each of a plurality of areas in an image plane to derive a distance data vector of the objects in the image plane;
   second measuring means for measuring brightness of the object positioned in each areas to derive a brightness data vector of the objects in the image plane;
   a first single-layered neural network having a plurality of neuron units arranged in a single layer and in which synapse connection weighting factors of the neuron units are corrected by means of self-organized feature mapping, without use of a teacher signal, such that the neural network selectively responds to distance data vectors of a large number of model patterns, said first neural network including means for firing a given neuron unit corresponding to the distance data vector and means for making a fired neuron unit correspond to a position of a main object, said first neural network determining the position of the main object according to the neuron unit fired when the distance data vector output from said first measuring means is input through the corrected synapse connection weighting factors;
   first calculating means for detecting a distance to the main object based on an output of said first neural network and the distance data vector output from said first measuring means and for calculating focus adjusting data according to a detected distance;
   a second single-layered neural network having a plurality of neuron units arranged in a single layer and in which synapse connection weighting factors of the neuron units are corrected by means of self-organized feature mapping, without use of a teacher signal, such that the neural network selectively responds to brightness data vectors of a large number of model patterns, said second neural network including means for firing a given neuron unit corresponding to the brightness data vector and means for making a fired neuron unit correspond to an exposure correction value, said second neural network determining the exposure correction value according to the neuron unit fired when the brightness data vector output from said second measuring means is input through the corrected synapse connection weighting factors; and second calculating means for calculating an exposure value based on an output of said second neural network and the brightness data vector output from said second measuring means;

whereby said first and second single-layered neural networks learn optimum main object position data and optimum exposure correction values by means of self-organized feature mapping, respectively, for given image planes, without use of a teacher signal.

2. A camera according to claim 1, wherein said first and second neural networks respectively include a feedback connection coupling an output of one of said neuron units to an input of another neuron unit.

3. A camera according to claim 1, wherein first neural network comprises:

means for deriving a vector difference between the distance data vector and the synapse connection weighting factors for each neuron unit;

means for detecting a best-matching neuron unit having the minimum vector difference; and means for detecting the position of the main object corresponding to the best-matching neuron unit according to the relation between the neuron units and areas in which the main object is present, the relation being previously learned, and said second neural network comprises:

means for deriving a vector difference between the brightness data vector and the synapse connection weighting factors for each neuron unit;

means for detecting a best-matching neuron unit having the minimum vector difference; and means for detecting an exposure correction value corresponding to the best-matching neuron unit according to the relation between the neuron units and exposure correction values, the relation being previously learned.

4. A camera according to claim 2, further comprising self-organized feature mapping means for causing said first and second neural networks to be subjected to a learning process, said self-organized feature mapping means comprising means for initializing a synapse connection weighting factor vector Wi(t) of an i-th neuron unit by using random numbers, means for setting t to (t+1) and detecting a best-matching neuron unit c which satisfies the following equation for an input vector Xk of each model pattern:

$$||Xk - Wc(t)|| = \min\{||Xk - Wi(t)||\}$$

where Wc(t) is the synapse connection weighting factor vector of the best-matching neuron unit c, and means for setting Wi(t+1)=Wi(t)+α(t)×(Xk−Wi(t)) in the case of i ∈ Nc(t), and Wi(t+1)=Wi(t) in a case other than the case of i ∈ Nc(t), where α(t) is a learning coefficient and Nc(t) is a collection of neuron units lying near the best-matching neuron unit c.

5. A camera according to claim 4, wherein said self-organized feature mapping means includes first learning means for said first neural network and second learning means for said second neural network, said first learning means including means for detecting a vector difference between the distance data vector and the synapse connection weighting factor vector for each of a large number of model patterns, means for detecting a best-matching neuron unit having the minimum vector difference, and means for forming a table indicating the relation between areas in which the main object is present and the best-matching neuron units, and said second learning means including means for detecting a vector difference between the brightness data vector and the synapse connection weighting factor vector for each of a large number of model patterns, means for detecting a best-matching neuron unit having the minimum vector difference, and means for forming a table indicating the relation between exposure correction values and the best-matching neuron units.

6. A focus detection device for a camera, comprising:

measuring means for measuring distance of an object positioned in each of a plurality of areas in an image plane to derive a distance data vector of the objects in the image plane;

a single-layered neural network having a plurality of neuron units arranged in a single layer and in which synapse connection weighting factors of the neuron units are corrected by means of self-organized feature mapping, without use of a teacher signal, such that the neural network selectively responds to distance data vectors of a large number of model patterns, said single-layered neural network including means for firing a given neuron unit corresponding to the distance data vector and means for making a fired neuron unit correspond to a position of a main object, said single-layered neural network determining the position of the main object according to the neuron unit fired when the distance data vector output from said measuring means is input through the corrected synapse connection weighting factors; and calculating means for detecting a distance to the main object based on an output of said neural network and the distance data vector output from said measuring means and for calculating focus adjusting data according to a detected distance;

whereby said single-layered neural network learns optimum main object position data by means of self-organized feature mapping for given image planes, without use of a teacher signal.

7. A device according to claim 6, wherein said neural network includes a feedback connection coupling an output of one of said neuron units to an input of another neuron unit.

8. A device according to claim 6, wherein said neural network comprises:

means for deriving a vector difference between the distance data vector and the synapse connection weighting factors for each neuron unit;

means for detecting a best-matching neuron unit having the minimum vector difference; and means for detecting the position of the main object corresponding to the best-matching neuron unit according to the relation between the neuron units and areas in which the main object is present, the relation being previously learned.

9. A device according to claim 7, further comprising self-organized feature mapping means for causing said neural network to be subjected to a learning process, said self-organized feature mapping means comprising means for initializing a synapse connection weighting factor vector Wi(t) of an i-th neuron unit by using random numbers, means for setting t to (t+1) and detecting a best-matching neuron unit c which satisfies the following equation for an input vector Xk of each model pattern:

$$||Xk - Wc(t)|| = \min\{||Xk - Wi(t)||\}$$

where Wc(t) is the synapse connection weighting factor vector of the best-matching neuron unit c, and means for setting Wi(t+1)=Wi(t)+α(t)×(Xk−Wi(t)) in the case of i ε Nc(t), and Wi(t+1)=Wi(t) in a case other than the case of i ε Nc(t), where α(t) is a learning coefficient and Nc(t) is a collection of neuron units lying near the best-matching neuron unit c.

10. A device according to claim 9, wherein said self-organized feature mapping means includes means for detecting a vector difference between the distance data vector and the synapse connection weighting factor vector for each of a large number of model patterns, means for detecting a best-matching neuron unit having the minimum vector difference, and means for forming a table indicating the relation between area in which the main object is present and the best-matching neuron units.

11. An exposure value calculating device for a camera, comprising:

measuring means for measuring brightness of an object positioned in each of a plurality of areas in an image plane to derive a brightness data vector of the objects in the image plane;

a single-layered neural network having a plurality of neuron units arranged in a single layer and in which synapse connection weighting factors of the neuron units are corrected by means of self-organized feature mapping such that the neural network selectively responds to brightness data vectors of a large number of model patterns, said single-layered neural network including means for firing a given neuron unit corresponding to the brightness data vector and means for making a fired neuron unit correspond to an exposure correction value, said single-layered neural network determining the exposure correction value according to the neuron unit fired when the brightness data vector output from said measuring means is input through the corrected synapse connection weighting factors; and calculating means for calculating an exposure value based on an output of said neural network and the brightness data vector output from said measuring means;

whereby said single-layered neural network self learns optimum exposure correction values by means of self-organized feature mapping for given image planes, without use of a teacher signal.

12. A device according to claim 11, wherein said neural network includes a feedback connection coupling an output of one of said neuron units to an input of another neuron unit.

13. A device according to claim 11, wherein said neural network comprises:

means for deriving a vector difference between the brightness data vector and the synapse connection weighting factors for each neuron unit;

means for detecting a best-matching neuron unit having the minimum vector difference; and means for detecting the exposure correction value corresponding to the best-matching neuron unit according to the relation between the neuron units and the exposure correction value, the relation being previously learned.

14. A device according to claim 12, further comprising self-organized feature mapping means for causing said neural network to be subjected to a learning process, said self-organized feature mapping means comprises means for initializing the synapse connection weighting factor vector Wi(t) of an i-th neuron unit by using random numbers, means for setting t to (t+1) and detecting a best-matching neuron unit c which satisfies the following equation for an input vector Xk of each model pattern:

$$||Xk - Wc(t)|| = \min\{||Xk - Wi(t)||\}$$

where Wc(t) is the synapse connection weighting factor vector of the best-matching neuron unit c, and means for setting Wi(t+1)=Wi(t)+α(t)×(Xk−Wi(t)) in the case of i ε Nc(t), and Wi(t+1)=Wi(t) in a case other than the case of i ε Nc(t), where α(t) is a learning coefficient and Nc(t) is a collection of neuron units lying near the best-matching neuron unit c.

15. A device according to claim 14, wherein said self-organized feature mapping means includes means for detecting a vector difference between the brightness data vector and the synapse connection weighting factor vector for each of a large number of model patterns, means for detecting a best-matching neuron unit having the minimum vector difference, and means for forming a table indicating the relation between the exposure correction value and the best-matching neuron units.

* * * * *